United States Patent [19]

Castonguay

[11] 4,386,246
[45] May 31, 1983

[54] SHIELD ASSEMBLY FOR 800 TO 1600 AMPERE CIRCUIT BREAKER COMPARTMENTS

[75] Inventor: Roger N. Castonguay, Terryville, Conn.

[73] Assignee: General Electric Co., New York, N.Y.

[21] Appl. No.: 328,337

[22] Filed: Dec. 7, 1981

[51] Int. Cl.$^3$ ............................................. H01H 9/00
[52] U.S. Cl. ................................ 200/50 AA; 361/345
[58] Field of Search .................... 200/50 AA; 361/345

[56] References Cited

U.S. PATENT DOCUMENTS 3,614,350 10/1971 Eichelberger ....................... 361/345
4,146,915 3/1979 Yosida ................................. 361/345

Primary Examiner—A. T. Grimley
Assistant Examiner—Morris Ginsburg
Attorney, Agent, or Firm—Richard Menelly; Walter Bernkopf; Fred Jacob

[57] ABSTRACT

A compact and economic shield mechanism is used within circuit breaker compartments where a minimum separation distance exists between the end of the circuit breaker and the end of the compartment when the circuit breaker is first inserted within the compartment. The combination of an actuating lever and an extension spring converts the motion of the circuit breaker into a linear force sufficient to rapidly open the line and load shields within the minimum distance travelled by the breaker. The compartment line and load shields return to their closed position under a restoring force provided by the combination of a linear spring and a torsion spring when the breaker is withdrawn from the compartment.

10 Claims, 3 Drawing Figures

SHIELD ASSEMBLY FOR 800 TO 1600 AMPERE CIRCUIT BREAKER COMPARTMENTS

BACKGROUND OF THE INVENTION

U.S. patent applications Ser. Nos. 322,348 and 322,347 both filed Nov. 18, 1981 disclose a plurality of patents which describe various shield and shutter mechanisms for isolating line and power stabs within circuit breaker compartments. Both of these applications are incorporated herein for purposes of reference. The circuit breaker compartments within which the shield mechanisms described within the aforementioned applications are employed, have a sufficient spacing between the end of the circuit breaker and the end of the compartment to provide efficient means for opening and closing the line and load shields. The close spacing requirements between the breaker and the end of the compartment within which 800 and 1600 amp. circuit breakers are employed necessitates the requirement of a fast action-compact shield operating mechanism. Further, the close spacing which exists between the top of the circuit breaker and the circuit breaker compartment prevents the utilization of slideably mounted line and load shields.

The purpose of this invention is to provide a compact and rapid acting shield operating mechanism for close spaced circuit breaker compartments.

SUMMARY OF THE INVENTION

The invention comprises the arrangement of a pair of spring-loaded line and load shields for use in compact circuit breaker compartments wherein a connection between the actuating lever of the shield mechanism and the line and load shields is provided by a first tension spring to force the shield into an open configuration. The shields are drawn into a closed configuration by the force provided by a pair of second springs when the actuating lever no longer contacts the circuit breaker.

DESCRIPTION OF THE PREFERRED EMBODIMENT

Figure 1:
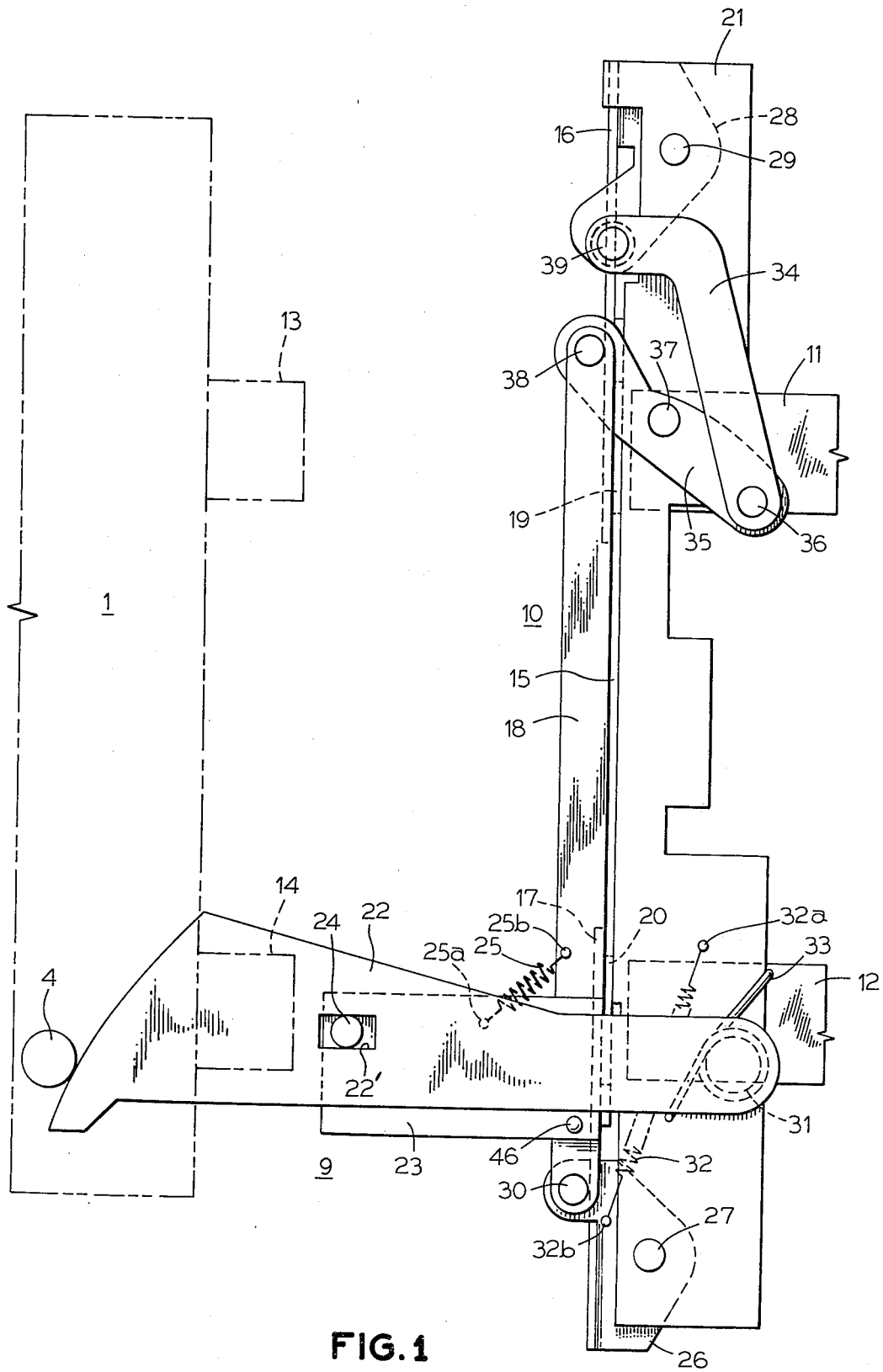
FIG. 1 is a side view of the shield assembly of the invention located within a circuit breaker compartment.

The compact and fast response shield assembly 10 of the invention is shown in FIG. 1 interposed between line and load stabs 11, 12 within a circuit breaker compartment generally designated as 9 and which includes a circuit breaker 1 extending partially within compartment 9. Until breaker 1 completely enters compartment 9, breaker line and load receivers 13, 14, cannot contact and connect with line and load stabs 11, 12 due to the closed configuration between top moveable shield 16 and bottom moveable shield 17. The closed configuration of top and bottom moveable shields 16, 17 also prevents inadvertent contact with line and load stabs 11, 12 by an operator when breaker 1 is completely removed from compartment 9. A fixed shield 15 containing line and load access slots 19, 20 and manufactured from a nonconducting material such as a glass enforced plastic resin also assists to isolate line and load stabs 11, 12 from line and load receivers 13 and 14 on circuit breaker 1. Side frame 21, which can consist of a sheet metal stamping, supports top shield hinge 28 by means of top pivot 29 and bottom shield hinge 26 by means of bottom pivot 27. Link operating lever pin 24 connecting with link operating lever 23 extends within actuator lever slot 22' which is formed within actuator lever 22. Actuator lever 22 is supported by link pivot 31 on side frame 21. Operating lever 23 is supported on connecting link 18 by means of pivot 46. When circuit breaker 1 is advanced within breaker compartment 9, circuit breaker pin 4, extending from the rear portion of breaker 1, contacts actuator lever 22 causing both actuator lever 22 and link operating lever 23 to rotate in a counterclockwise direction around link pivots 31 and 46. Override spring 25, connected to link operating lever 23 and connecting link 18, becomes extended and translates the downward motion of actuator lever 22 and link operating lever 23 to a spring force applied to connecting link 18. Connecting link 18, connected to bottom shield hinge 26 by means of bottom link pin 30, rapidly moves in a downward direction which causes bottom shield hinge 26 to rotate in a counterclockwise direction. Bottom moveable shield 17, which is fixedly connected to bottom shield hinge 26, rotates in a counterclockwise direction to expose load access slot 20. The connection between connecting link 18 and drive link 35 by means of top link pin 38 rotates drive link 35 counterclockwise around drive link pivot 37 causing shield link 34 to move upwards by means of the pivotable connection between shield link 34 and drive link 35 by means of bottom pivot 36. The upward motion of shield link 34, which is connected with top shield hinge 28 by means of shield link top pivot 39, causes rotation of top shield hinge 28 around top pivot 29 in a clockwise direction. Top moveable shield 16, which is fixedly connected with top shield hinge 28 is forced to rotate in a clockwise direction to expose line access slot 19.

Figure 2:
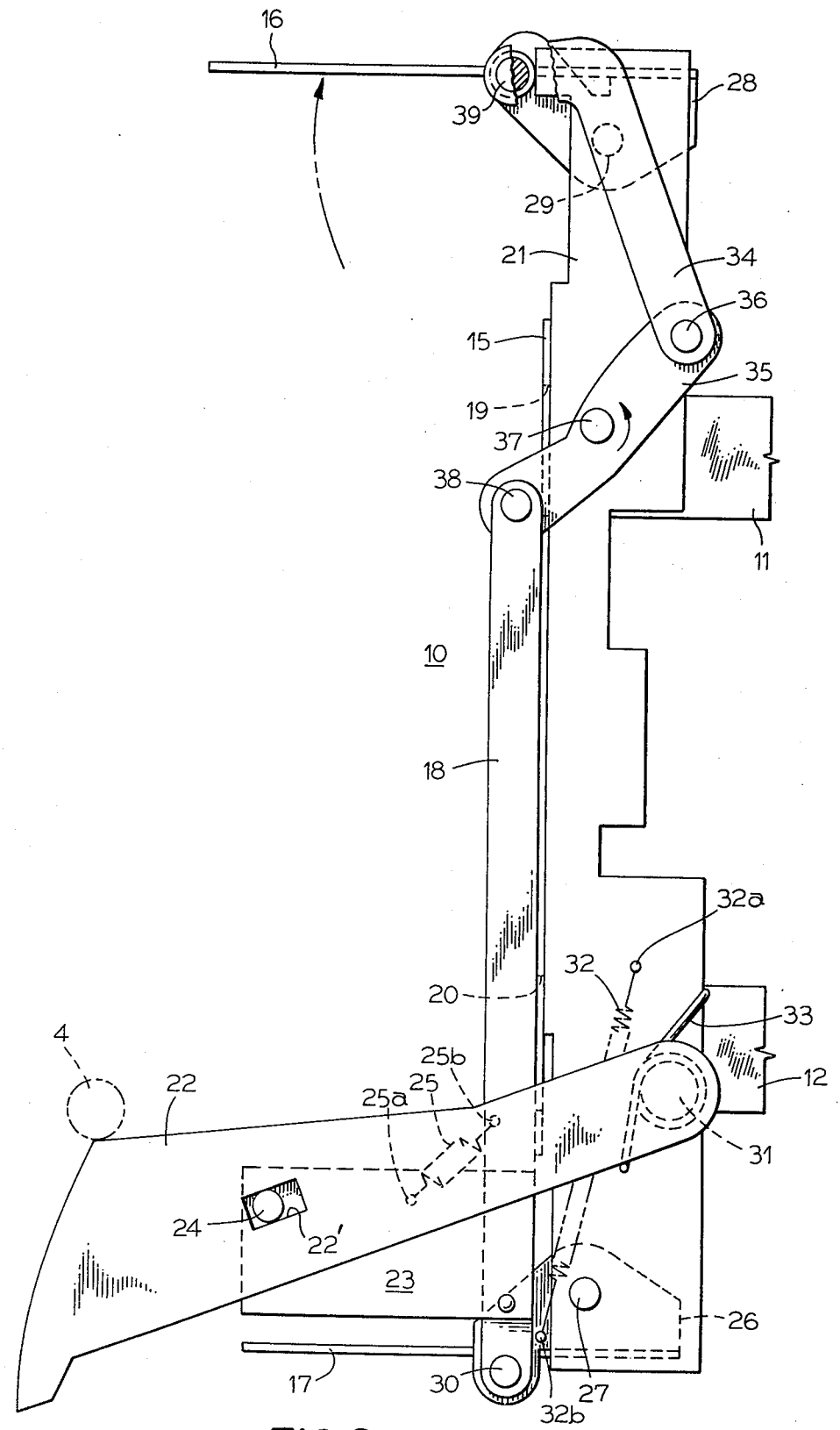
FIG. 2 is a side view of the shield assembly depicted in FIG. 1.

The open configuration of shield assembly 10 is shown in FIG. 2 with actuator lever 22 extended and link operating lever 23 also extended by means of the connection between actuator lever 22 and link operating lever 23 effected by link operating lever pin 24 extending within actuator lever slot 22'. Connecting link 18 is depicted in a downward extended position with override spring 25, connected with link operating lever 23 at one end by means of slot 25a and connected with connecting link 18 by means of slot 25b, becomes fully extended while translating the pivotable movement of actuator lever 22 and link operating lever 23 into a vertically directed downward force acting upon connecting link 18. Bottom moveable shield 17 is shown rotated counterclockwise about bottom pivot 27 by connection with bottom shield hinge 26 to expose load access slot 20 and to provide access to load stab 12. Drive link 35, connected with downwardly extending connecting link 18 by means of top link pin 38, is shown in a downwardly pivoted position around drive link pivot 37 which forces shield link 34 into an upward position by connection between shield link bottom pivot 36 as described earlier. Top moveable shield 16 is moved into an open position by connection with top shield hinge 28 to expose line access slot 19 for access to line stab 11. In the open position depicted in FIG. 2, torsion spring 33 which extends around link pivot 31 and is anchored to side panel 21 at one end and hooked to the lower end of actuator lever 22 at the other end, becomes wound up because of the downward force exerted by means of actuator lever 22. Linear return spring 32, connected at one end to side frame 21 by means of slot 32a and to bottom shield hinge 26 at an opposite end by means of slot 32b, becomes extended due to the downward motion of bottom shield hinge 26. Upon removal of circuit breaker 1 (FIG. 1) from compartment 9, actuator lever 22 pivots in a clockwise direction about link pivot 31 by the return force provided by torsion return spring 33. Connecting link 18 is now returned to the upward position shown in FIG. 1 by means of the restoring force provided by linear return spring 32. Linear return spring 32 also forces bottom shield hinge 26 to pivot in a clockwise direction and exerts restoring force to connecting link 18 by means of the connection provided by bottom link pin 30.

Figure 3:
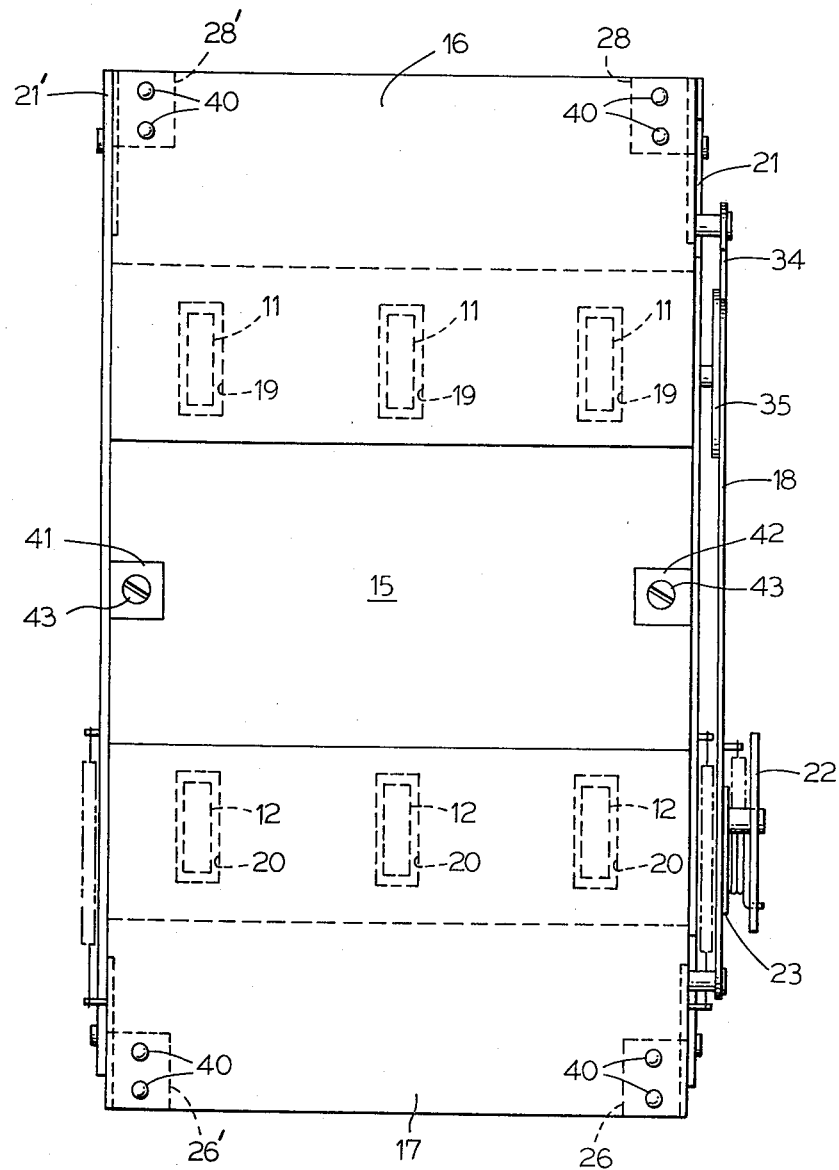
FIG. 3 is a front view of the shield assembly depicted in FIG. 1 in an open configuration.

FIG. 3 shows shield assembly 10 in a closed configuration within breaker compartment 9, similar to that of FIG. 1 wherein the line and load stabs 11, 12, depicted in dashed lines are within line and load slots 19, 20 also on dashed lines behind line and load shields 16, 17. Connecting link 18 is shown in its upward closed position connected with drive link 35. Top shield hinge 28 and bottom shield hinge 26 are connected to shields 16 and 17 by means of top and bottom rivets 40. Slots 41 and 42 are provided within fixed shield 15 to provide clearance for mounting screws 43 which hold assembly 10 to the rear of compartment 9.

In contrast with the aforementioned U.S. patent applications, shield assembly 10 is inserted within breaker compartment 9 as depicted in FIG. 3. There is no opposite shield assembly 10 on the opposite side of frame 21 to prevent access to line and load stabs 13 and 14 by an operator when circuit breaker 15 is removed. However, it is to be noted that an opposing side frame 21' is employed to support hinges 26', 28' as well as to support the opposite sides of moveable shields 16, 17 and fixed shield 15.

I claim:

1. A shield assembly for insertion within circuit breaker compartments to isolate the line and power stabs within the compartment comprising:
   a fixed shield for insertion within a circuit breaker compartment and having a top and a bottom slot for providing access to line and load stabs within said compartment;
   a top and a bottom moveable shield connected together by a link arrangement to move away from each other to expose said access slots when said circuit breaker is at least partially withdrawn from said compartment and to move towards each other to cover said access slots when said circuit breaker is removed from said compartment;
   a connecting link extending between said link arrangement and a link operating lever by means of an override spring for moving said connecting link in a downward direction when said circuit breaker is inserted within said compartment; and
   an actuator lever connected with said operating lever for moving said operating lever in a downward direction when said circuit breaker contacts said actuator lever.

2. The shield assembly of claim 1 including at least one top and one bottom shield hinge fixedly connected with said top and said bottom moveable shields, respectively, each of said hinges being pivotally connected with a side frame 3. The assembly of claim 2 wherein said link arrangement comprises a drive link connected with said connecting link and with a shield link, said drive link being pivotally connected with said side frame and pivotally connected with said shield link and with said shield hinge.

4. The shield assembly of claim 2 including a linear return spring connected to the side frame at one end and to said bottom shield hinge at an opposite end for moving said bottom shield hinge in a clockwise direction when said circuit breaker is removed from said compartment.

5. The shield assembly of claim 2 including a torsion return spring on said side frame for moving said operating lever in a clockwise direction when said circuit breaker is removed from said compartment.

6. The shield assembly of claim 1 wherein said actuator lever contains means defining a slot and wherein said operating lever contains a pin attached to said operating lever and extending to within said slot for causing said actuator lever and said operating lever to move in unison.

7. A shield assembly for isolating line and power stabs within circuit breaker compartments comprising:
   a side frame supporting a fixed insulating shield and a top and a bottom moveable shield, said top and bottom moveable shields being connected together by a connecting link;
   a top shield hinge pivotally attached to said side frame and connected with said connecting link by means of a shield link and a drive link pivotally connected together;
   a bottom shield hinge fixedly attached to said bottom moveable shield and connected with said side frame by means of a pivot;
   an actuator lever connected to said side frame by a pivot, said actuator lever having means defining a slot containing a pin fixedly attached to a link operating lever for causing said actuator lever and said link operating lever to move in unison.

8. The assembly of claim 7 including a torsion return spring attached to said side frame for returning said actuator lever and said link operating lever when said circuit breaker is removed from said circuit breaker compartment.

9. The shield assembly of claim 7 including a linear return spring attached at one end to said side frame and at an opposite end to said bottom shield hinge for rotating said bottom shield hinge in a clockwise direction when said circuit breaker is removed from said breaker compartment.

10. The assembly of claim 7 including an override spring connected with said link operating lever at one end and with said connecting link at an opposite end for causing said operating lever to move in a downward direction when said actuator lever and said link operating lever are rotated in a counterclockwise direction.

* * * * *